United States Patent [19]

Kamp

[11] Patent Number: 4,540,537
[45] Date of Patent: Sep. 10, 1985

[54] METHOD AND EXTRUDING DIE APPARATUS FOR PRODUCING A PLASTIC CLOSURE STRIP

[75] Inventor: Ewald A. Kamp, Chicago, Ill.

[73] Assignee: Union Carbide Corporation, Danbury, Conn.

[21] Appl. No.: 583,495

[22] Filed: Mar. 1, 1984

Related U.S. Application Data

[63] Continuation of Ser. No. 196,327, Oct. 14, 1980, abandoned, which is a continuation of Ser. No. 25,665, Mar. 30, 1979, abandoned.

[51] Int. Cl.³ .................................................. B29F 3/04
[52] U.S. Cl. ..................................... 264/171; 156/66; 156/244.15; 156/500; 264/177 R; 425/131.1; 425/462; 425/466
[58] Field of Search .................. 264/171, 173, 177 R, 264/176 R, 563–566, 569; 425/380, 461–462, 464–466, 467, 326.1, 131.1; 156/244.15, 244.25, 500, 66; 383/63

[56] References Cited

U.S. PATENT DOCUMENTS

| 3,195,184 | 7/1965 | Svec | 264/564 |
|---|---|---|---|
| 3,326,399 | 6/1967 | Ausnit | 215/3 |
| 3,340,116 | 9/1967 | Naito | 156/244.15 |
| 3,579,730 | 5/1971 | Ausnit | 425/131.1 |
| 3,597,795 | 8/1971 | Naito | 18/14 R |
| 3,743,460 | 7/1973 | Woolridge | 425/133.5 |
| 4,003,972 | 1/1977 | Herz | 264/40.3 |
| 4,069,092 | 1/1978 | Zink et al. | 156/500 |
| 4,212,337 | 7/1980 | Kamp | 383/63 |
| 4,259,133 | 3/1981 | Yagi | 156/91 |
| 4,295,919 | 10/1981 | Sutrina et al. | 156/244.25 |

FOREIGN PATENT DOCUMENTS

| 51-15070 | 5/1976 | Japan . | |
| 1444326 | 7/1976 | United Kingdom | 156/244.25 |

Primary Examiner—Jeffery Thurlow
Attorney, Agent, or Firm—John C. Lefever; Real J. Grandmaison

[57] ABSTRACT

An extrusion die apparatus for producing at least one plastic closure strip having profile and base portions, includes a die body having a die face, a profile channel defined in the die body and communicating with a profile die opening in the die face for extruding a profile portion, and a base channel defined in the die body and communicating with a base die opening in the face for extruding a base portion. The channels are adjacent to each other near the die openings and separated by a portion of the die body which terminates short of the face so that the extruded profile and base portions join together before exiting the die body.

35 Claims, 13 Drawing Figures

METHOD AND EXTRUDING DIE APPARATUS FOR PRODUCING A PLASTIC CLOSURE STRIP

This application is a continuation of prior U.S. application Ser. No. 196,327, filed 10/14/80, which is a continuation of application Ser. No. 25,665, filed 3/30/79, both abandoned.

The present invention relates to an extrusion die apparatus for producing a plastic closure device including two closure strips, wherein each closure strip includes profile and base portions and particularly to an extrusion die apparatus for producing a plastic closure strip in which the extruded profile and base portions join together before exiting the die body.

Plastic bags including plastic closure devices are well-known and in popular use. Typically, a plastic closure device includes two closure strips which interlock together. Each closure strip includes a profile portion and a base portion.

It is the two complementary profile portions of two closure strips which become occluded when the closure device is closed. The integrity of the shapes of the profile portions must be maintained during the production of the closure strips so that good occlusion is obtained. In addition, the joining together of the profile and base portions must be done in a manner to avoid distortions which can interfere with the preferred shape of the closure strip.

The closure device described in U.S. Pat. No. 4,212,337 having the same applicant and assignee as the instant application is a typical closure device suited for being produced by the instant invention.

The prior art method and apparatus for producing a closure strip includes the separate extrusion and forming of profile and base portions and subsequently, joining these portions together. This method has drawbacks and is not suitable for commercial high production of many closure strips. One drawback is that relatively slow cooling, such as air cooling, is required and this results in low production rates.

The instant invention overcomes the problems arising from the prior art method and apparatus. The invention allows good control of the extrusion of the profile and base portions as well as a good maintenance of the integrity of the shape of the closure strip. An additional feature is that different plastic material can be used for the profile and base portions.

One embodiment of the invention is an extrusion die apparatus for producing at least one plastic closure strip having profile and base portions, comprising a die body having a die face, at least a first profile channel defined in the die body and communicating with a corresponding first profile die opening in the die face for extruding a first profile portion, and at least a first base channel defined in the die body communicating with a corresponding first base die opening in the die face for extruding a first base portion, the first profile and first base channels being adjacent to each other near the first profile and first base die openings and separated by a first portion of the die body which terminates short of the die face so that the extruded first profile portion and first base portion join together before exiting the die body.

Another embodiment of the invention further includes a second profile channel defined in the die body and communicating with a corresponding second profile die opening in the die face for extruding a second profile portion, and a second base channel defined in the die body and communicating with a corresponding second base die opening in the die face for extruding a second base portion, the second profile and second base channels being adjacent to each other near the second profile and second base die openings and separated by a second portion of the die body which terminates short of the die face so that the extruded second profile portion and second base portion join together before exiting the die body.

A further embodiment of the invention teaches a plurality of separate profile channels defined in the die body and communicating with corresponding profile die openings in the die face for extruding separate profile portions, the plurality of profile channels being adjacent to the first base channel near the die openings and separated by the first portion of the die body so that the extruded plurality of profile portions join the first base portion before all of the portions exit the die body.

Yet another embodiment of the invention is in the method for producing at least one plastic closure strip having profile and base portions comprising extruding at least a first profile portion, extruding at least a first base portion, and joining the first profile and first base portions together, the improvement wherein the first profile and first base portions are joined together before exiting the die body.

Further embodiments and advantages of the invention will be set forth in part in the following specification and in part will be obvious therefrom without being specifically referred to, the same being realized and attained as pointed out in the claims hereof.

The invention accordingly comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description, taken in connection with the accompanying drawings, in which.

Figure 10A:
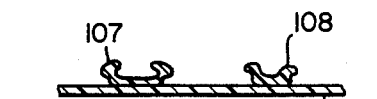
Figure 10B:
Figure 9:
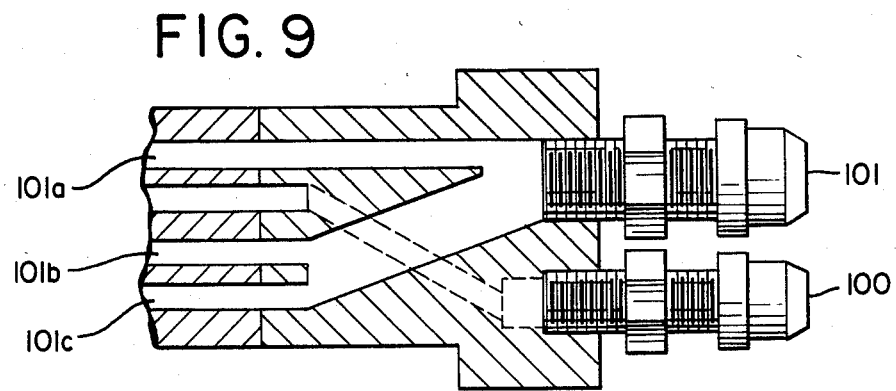
Figures 4, 5:
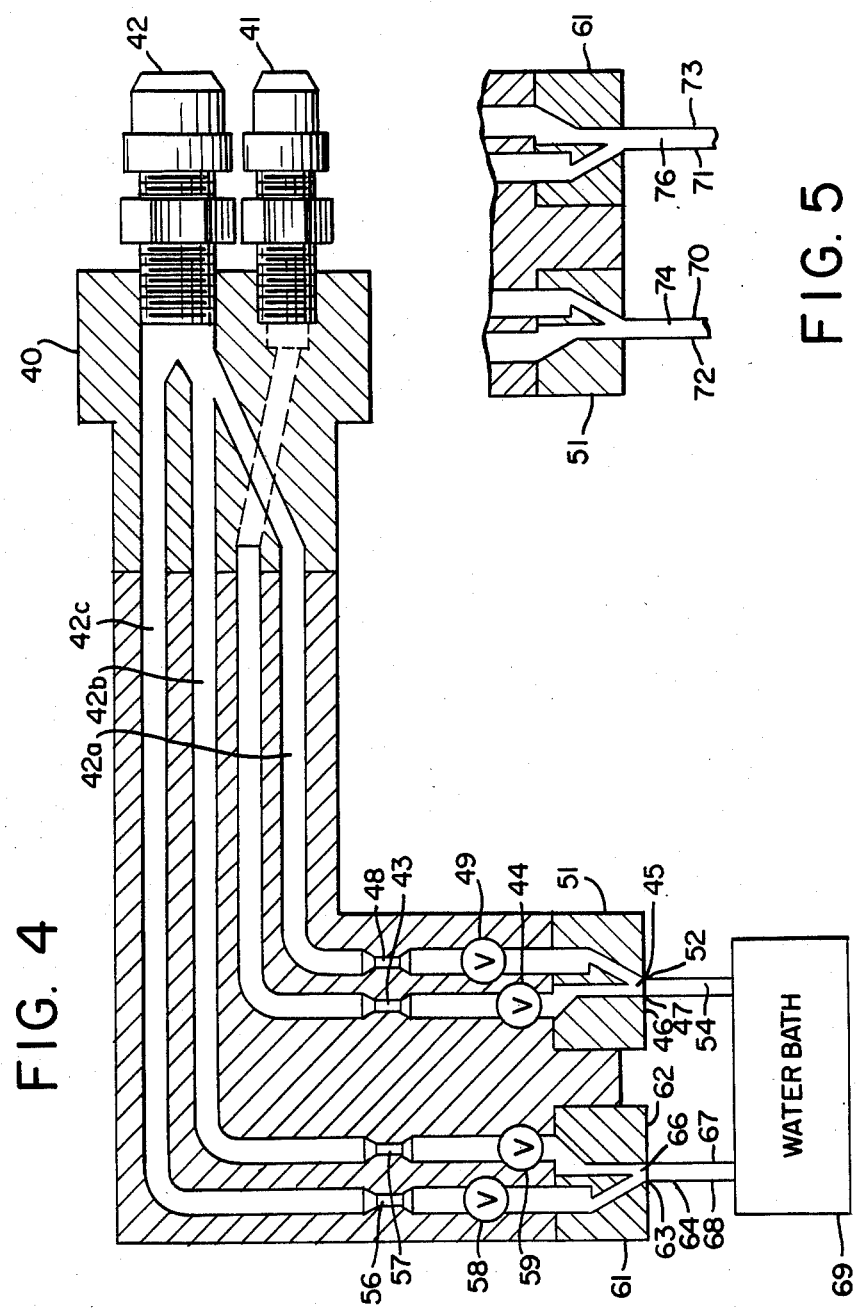
FIG. 4 is a diagrammatic sectional view of an apparatus according to the invention.
FIG. 5 is a diagrammatic partial sectional view showing another embodiment of an apparatus according to the invention.
Figure 8A:
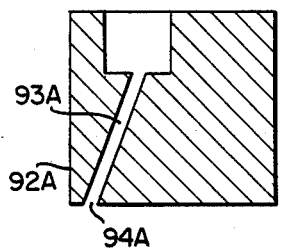
Figure 8B:
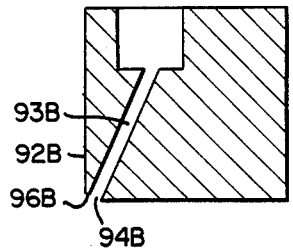
Figure 8C:
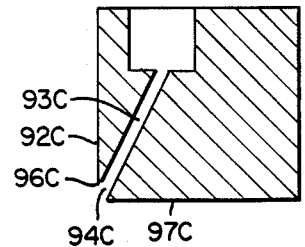

FIGS. 8A, 8B, and 8C are sectional views of different control bars;

FIG. 9 is a diagrammatic partial sectional view showing another embodiment of a flow diverter for the apparatus shown in FIG. 4; and FIGS. 10A and 10B each shows a cross-sectional view of a combined closure strip produced by an apparatus according to the invention.

In carrying the invention into effect, certain embodiments have been selected for illustration in the accompanying drawings and for description in the specification, reference being had to the FIGS. 1 to 10.

Figure 1:
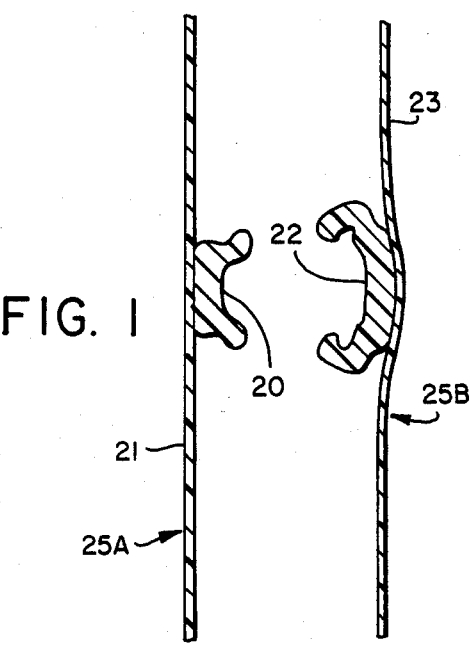
FIG. 1 shows a cross-sectional view of two closure strips which form a closure device and which are suitable for being produced by the invention.

FIG. 1 shows a closure device in accordance with the aforementioned U.S. Pat. No. 4,212,337. The profile portion 20 is joined to a base portion 21 and profile portion 22 is joined to base portion 23. The profile portions 20 and 22 are complementary and profile portion 20 can be engaged in the profile portion 22. The two closure strips 25A and 25B constitute a closure device.

Figure 2:
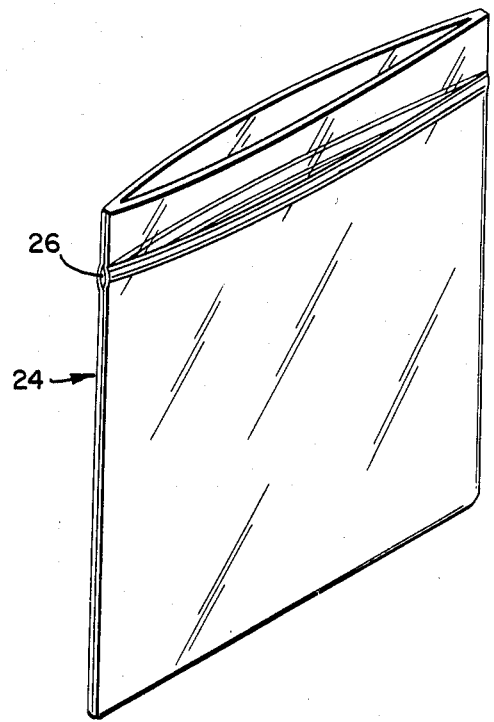
FIG. 2 shows a plastic bag incorporating a closure device as shown in FIG. 1.

FIG. 2 shows a typical plastic bag 24 which includes a closure device 26. It has been found economical to produce the two closure strips of the closure device 26 separately and connect them to a film web during the manufacturing of the bag 24.

Thus, it is desirable to have an economical and reliable extrusion die apparatus for producing the closure strips which constitute closure device 26.

Figure 3:
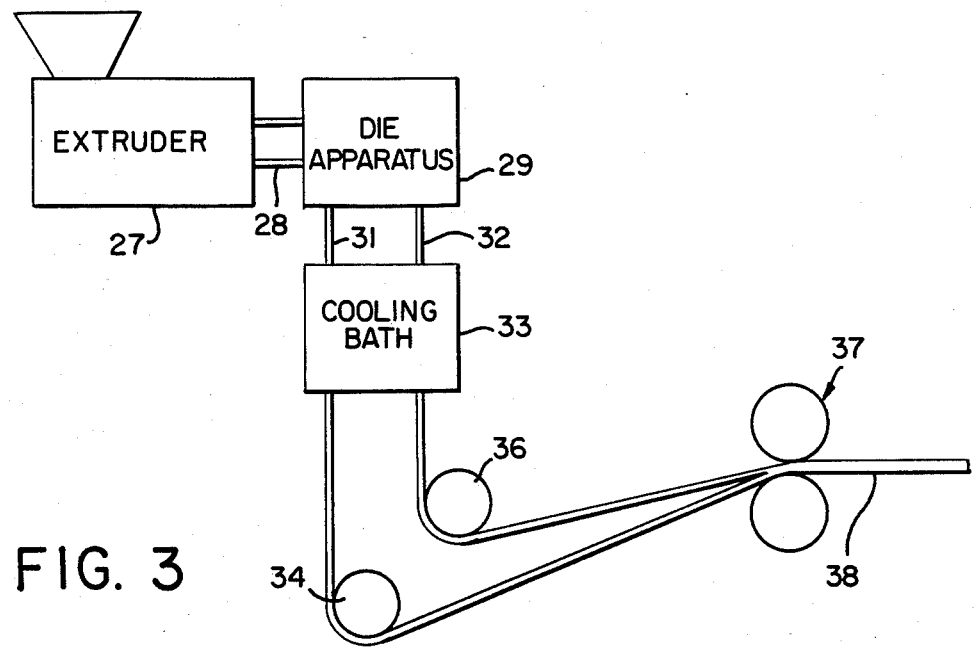
FIG. 3 shows diagrammatic side elevational view of an extrusion system including an apparatus according to the invention.

The closure strips of closure device 26 can be made by an extrusion system which includes an extrusion die apparatus in accordance with the invention as shown in FIG. 3. Extruder 27 is connected by a conduit 28 to an extrusion die apparatus 29. Extruded closure strips 31 and 32 are produced by the extrusion die apparatus and enter a cooling bath 33, such as a container of water and are then redirected by rollers 34 and 36 to nip rollers 37 where the closure strips 31 and 32 are occluded together to form a continuous closure device 38. The rate at which the continuous closure device 38 is produced depends upon the size and screw speed of the extruder 27, melt flow of the material, the speed of the nip rollers 37, the cooling rate, and the adjustment of the die components producing the closure strips 31 and 32 as well as other factors.

Generally, equipment for extruding plastic material is well-known in the art and considerable prior art exists relevant to the extrusion of closure devices. FIG. 4 shows a partial sectional view of an extrusion die apparatus in accordance with the invention and details such as assembly screws, die heaters, sensing control elements, etc. have been omitted for clarity. The flow diverter 40 establishes the distribution pattern for the plastic material being supplied. Plastic material under pressure is communicated to the channels 41 and 42 and then through the flow diverter 40. Channel 41 is connected to a control orifice 43 and an adjustable valve control 44 before reaching control bar 46 and die opening 45. The die opening 45 is an outlet and shape controller for a base portion.

The channel 42 is connected to channels 42a, 42b and 42c. The channel 42a goes through a control orifice 48 and an adjustable valve control 49 before reaching control bar 51 and die opening 52. The die opening 52 is an outlet and shape controller for a closure profile. The die body portion 47 between the channels 41 and 42a terminates short of the face of the die body so that the profile and base portions contact each other and join together before exiting from the die body to form a closure strip 54.

The apparatus shown in FIG. 4 includes a part for producing another closure strip 68 which is complementary to the closure strip 54.

The channels 42b and 42c pass through control orifices 56 and 57 and adjustable valve controls 58 and 59 and eventually reach control bars 61 and 62. Die opening 63 is an outlet and shape controller for a profile portion 64 and die opening 66 is an outlet and shape controller for a base portion 67.

The profile portion 64 and base portion 67 contact each other and join together before exiting the die body to form closure strip 68. The closure strips 54 and 68 enter a water bath 69 for cooling the plastic material.

FIG. 5 shows, in part, another embodiment for the extrusion of closure strips. For the embodiment in FIG. 5, the closure strips are reversed as compared to the embodiment shown in FIG. 4. That is, profiles 70 and 71 face each other while the base portions 72 and 73 are on the outside of the closure strips 74 and 76. The difference in the arrangement shown between FIG. 4 and 5 can be achieved by the choice of arrangement of the control bars 46, 51, 61 and 62.

Figure 6:
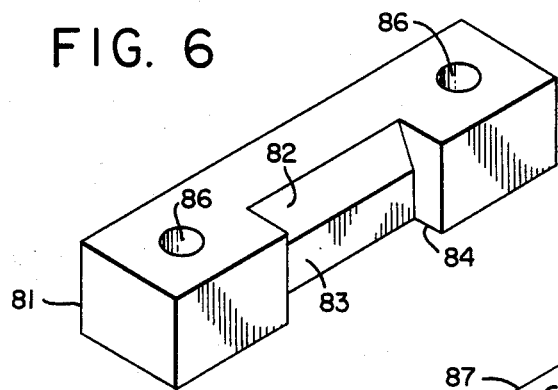
FIG. 6 is a perspective view of a control bar used in FIG. 4.

FIG. 6 shows a typical control bar 81 for producing a base portion of a closure strip. A lead-in taper 82, control "land" 83, and recess 84 are factors determining the size and shape of the extruded material. The control land 83 and recess 84 are shown as being linear, but this is not necessarily the preferred embodiment. Generally, the control land 83 can be either a gentle contour or have steps of different depths. The control land 83 can be straight in the direction determining width and have a variable height so that thickness variations can be controlled.

The width of the control land 83 depends upon the width of the base portion desired. Mounting holes 86 allow the control bar 81 to be mounted or removed conveniently.

Figure 7:
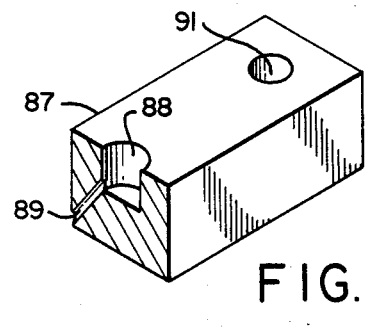
FIG. 7 is a perspective sectional view of another control bar used in FIG. 4.

FIG. 7 shows a sectional perspective view of a control bar 87 for producing a profile portion of a closure strip. A counter bore 88 communicates with a plastic material being supplied under pressure and also communicates with channel 89 which defines the shape of the profile portion. The channel 89 can be formed with good precision through the use of an electro-deposition method in accordance with known technology. The mounting hole 91 permits the mounting and removal of the control bar 87.

FIGS. 8A, 8B, and 8C show cross-sectional views of three control bars having profile channels in different locations. Profile bar 92A shows profile channel 93A with die opening 94A spaced apart from the location of where the die opening for the base portion would be so that the base and profile portions join together outside the die body in accordance with the prior art. Control bar 92B shows profile channel 93B having a die opening 94B which will produce base and profile portions which will join together just before exiting the die body because the die body portion 96B is just short of the die face. Control bar 92C includes a profile channel 93C and a die opening 94C and features a die body portion 96C which is recessed from about 0.010 inch to about 0.250 inch away from the face 97C, preferably from about 0.015 inch to about 0.09 inch. The separation between the profile and base channels at the die openings is less than 0.040 inch and preferably about 0.020 inch and more preferably yet from about 0.002 inch to about 0.008 inch. The profile and base portions produced will join together before exiting the die body. The control bar 92C can be used advantageously with a low draw ratio of about 1:4, a high operating speed of about 300 feet per minute, and rapid cooling means such as a water bath. Cooling can also be established by liquid spray or other known ways.

FIG. 9 shows a partial sectional view of another embodiment of a flow diverter. Channel 100 supplies plastic material to one base portion extrusion opening whereas channel 101 communicates with channels 101a, 101b, and 101c for forming two profile portions as well as one base portion. This arrangement permits the selection of one of the portions as being a different color or composition from the other portions.

FIGS. 10A and 10B show two intermediate products which can be extruded from an extrusion die apparatus according to the invention by positioning two profile die openings near a wide base die opening. Cutting base portion 106 between the profile portions 107 and 108 will produce two closure strips. Similar operations on base portion 109 will produce four closure strips.

It is to be understood that there is no desire for the invention to be limited to the exact details of construction shown and described, for obvious modifications will occur to a person skilled in the art.

Having thus described the invention, what is claimed as new and desired to be secured by Letters Patent is as follows:

1. A coextrusion apparatus for use with extruder means for forming a plurality of combined interlocking closure strips having profile portions and base portions, comprising, in combination:
   (a) extruder channels communicating with said extruder means for receiving a plurality of plastic feed materials under pressure from said extruder means.
   (b) flow diverter means communicating with said extruder channels, and adapted to establish alternate distribution patterns for said plastic feed materials, said flow diverter means comprising at least a first base channel for receiving a first plastic feed material and communicating with a removable first base control bar for forming a first base portion of said closure strips, said flow diverter means further comprising a plurality of channels for receiving a second plastic feed material, one of said plurality of channels comprising a first profile channel communicating with a removable first profile control bar for forming a first profile portion of said closure strips, one of said plurality of channels comprising a second base channel commuicating with a removable second base control bar for forming a second base portion of said closure strips, and one of said plurality of channels comprising a second profile channel communicating with a removable second profile control bar for forming a second profile portion of said closure strips;
   (c) a removable first base control bar communicating with said first base channel, said first base control bar having a first base portion die opening for extruding a first base portion;
   (d) a removable first profile control bar communicating with said first profile channel, said first profile control bar having a first profile portion die opening for extruding a first profile portion;
   (e) a removable second base control bar communicating with said second base channel, said second base control bar having a second base portion die opening for extruding a second base portion; and
   (f) a removable second profile control bar communicating with said second profile channel, said second profile control bar having a second profile portion die opening for extruding a second profile portion.

2. A coextrusion apparatus as in claim 1 wherein said first base portion die opening and said first profile portion die opening merge prior to the exit of said die openings.

3. A coextrusion apparatus as in claim 1 wherein said second base portion die opening and said second profile portion die opening merge prior to the exit of said die openings.

4. A coextrusion apparatus as in claim 1 wherein said first base portion die opening and said first profile portion die opening merge prior to the exit of said die opening, and said second base portion die opening and said second profile portion die opening merge prior to the exit of said die openings.

5. A coextrusion apparatus as in claim 1 wherein said first base channel is adapted to receive plastic feed materials having a composition different from the plastic feed materials received by said first profile channel.

6. A coextrusion apparatus as in claim 1 wherein said first base channel is adapted to receive plastic feed materials containing a color agent for said first base portion of said closure strips.

7. A coextrusion apparatus as in claim 1 including means adapted to control the flow of plastic feel materials within each of said first base channel, said first profile channel, said second base channel, and said second profile channel.

8. A coextrusion apparatus as in claim 7 wherein said means comprises a flow control orifice.

9. A coextrusion apparatus as in claim 7 wherein said means comprises adjustable valve control means.

10. A coextrusion apparatus for use with extruder means for forming a plurality of combined interlocking closure strips having profile portions and base portions, comprising, in combination:
   (a) extruder channels communicating with said extruder means for receiving a plurality of plastic feed materials under pressure from said extruder means;
   (b) flow diverter means communicating with said extruder channels, and adapted to establish alternate distribution patterns for said plastic feed materials, said flow diverter means comprising at least a first channel for receiving a first plastic feed material and communicating with a removable first control bar for forming a first portion of a first closure strip, said flow diverter means further comprising a plurality of channels for receiving a second plastic feed material, one of said plurality of channels comprising a second channel communicating with a removable second control bar for forming a second portion of said first closure strip, one of said plurality of channels comprising a third channel communicating with a removable third control bar for forming a first portion of a second closure strip, and one of said plurality of channels comprising a fourth channel communicating with a removable fourth control bar for forming a second portion of said second closure strip;
   (c) a removable first control bar communicating with said first channel, said first control bar having a first portion die opening for extruding a first portion of a first closure strip;
   (d) a removable second control bar communicating with said second channel, said second control bar having a second portion die opening for extruding a second portion of said first closure strip;
   (e) a removable third control bar communicating with said third channel, said third control bar having a first portion die opening for extruding a first portion of a second closure strip; and (f) a removable fourth control bar communicating with said fourth channel, said fourth control bar having a second portion die opening for extruding a second portion of said second closure strip.

11. A coextrusion apparatus as in claim 10 wherein said first portion die opening of said first control bar and said second portion die opening of said second control bar merge prior to the exit of said die openings.

12. A coextrusion apparatus as in claim 10 wherein said first portion die opening of said third control bar and said second portion die opening of said fourth control bar merge prior to the exit of said die openings.

13. A coextrusion apparatus as in claim 10 wherein said first portion die opening of said first control bar and said second portion die opening of said second control bar merge prior to the exit of said die openings, and said first portion die opening of said third control bar and said second portion die opening of said fourth control bar merge prior to the exit of said die openings.

14. A coextrusion apparatus as in claim 10 wherein said first channel is adapted to receive a plastic feed material having a composition different from the plastic feed material received by said second channel.

15. A coextrusion apparatus as in claim 10 wherein said first channel is adapted to receive a plastic feed material containing a coloring agent.

16. A coextrusion apparatus as in claim 10 wherein said first control bar has a die opening for extruding the base portion of said first closure strip.

17. A coextrusion apparatus as in claim 10 wherein said first control bar has a die opening for extruding the profile portion of said first closure strip.

18. A coextrusion apparatus as in claim 10 including means adapted to control the flow of plastic feed materials within each of said first base channel, said first profile channel, said second base channel, and said second profile channel.

19. A coextrusion apparatus as in claim 18 wherein said means comprises a flow control orifice.

20. A coextrusion apparatus as in claim 18 wherein said means comprises adjustable valve control means.

21. A method for coextruding a plurality of combined interlocking closure strips having profile portions and base portions, comprising the steps:
 (a) extruding a plurality of plastic feed materials under pressure into extruder channels communicating with a flow diverter means;
 (b) establishing alternate distribution patterns for said plastic feed materials with said flow diverter means whereby the plastic feed materials from one of said extruder channels passes to a first channel communicating with a removable first control bar for forming a first base portion of a first closure strip, and the plastic feed materials from another of said extruder channels passes to a plurality of channels, wherein one of said plurality of channels comprises a second channel communicating with a removable second control bar for forming a first profile portion of said first closure strip, one of said plurality of channels comprises a third channel communicating with a removable third control bar for forming a second base portion of a second closure strip, and one of said plurality of channels comprises a removable fourth channel communicating with a fourth control bar for forming a second profile portion of said second strip;
 (c) passing said plastic feed material from said first channel to the die opening for said removable first control bar, and extruding a first base portion of a first closure strip therefrom;
 (d) passing said plastic feed material from said second channel to the die opening of said removable second control bar, and extruding a first profile portion of said first closure strip therefrom;
 (e) passing said plastic feed material from said third channel to the die opening of said removable third control bar, and extruding a second base portion of a second closure strip therefrom; and
 (f) passing said plastic feed material from said fourth channel to the die opening of said removable fourth control bar, and extruding a second profile portion of said second closure strip therefrom.

22. A method in accordance with claim 21 including joining the extrudates from said first control bar and said second control bar before said extrudates exit from the die openings of said first control bar and said second control bar.

23. A method in accordance with claim 21 including joining the extrudates from said third control bar and said fourth control bar before said extrudates exit from the die openings of said third control bar and said fourth control bar.

24. A method in accordance with claim 21 including joining the extrudates from said first control bar and said second control bar before said extrudates exit from the die openings of said first control bar and said second control bar, and joining the extrudates from said third control bar and said fourth control bar before said extrudates exit from the die openings of said third control bar and said fourth control bar.

25. A method in accordance with claim 21 wherein said plastic feed material in said first channel has a composition different from the plastic feed material of said second channel.

26. A method in accordance with claim 21 wherein said plastic feed material in said first channel contains a coloring agent for said first portion of said first closure strip.

27. A method in accordance with claim 21 including controlling the flow of said plastic feed materials within each of said first channel, said second channel, said third channel, and said fourth channel.

28. A method in accordance with claim 27 including controlling said flow of said plastic feed materials by a flow control orifice.

29. A method in accordance with claim 27 including controlling said flow of said plastic feed materials by adjustable valve control means.

30. A method for coextruding a plurality of combined interlocking closure strips having profile portions and base portions, comprising the steps:
 (a) extruding a plurality of plastic feed materials under pressure into extruder channels communicating with a flow diverter means;
 (b) establishing alternate distribution patterns for said plastic feed materials with said flow diverter means whereby the plastic feed materials from one of said extruder channels passes to a second base channel communicating with a removable first control bar for forming a second base portion of said closure strips, and the plastic feed materials from another of said extruder channels passes to a plurality of channels wherein one of said plurality of channels comprises a first profile channel communicating with a removable second control bar for forming a first profile portion of said closure strips, one of said plurality of channels comprising a first base channel communicating with a removable third control bar for forming a first base portion of said closure strips, and one of said plurality of channels comprising a second profile channel communicating with a removable fourth control bar for forming a second profile portion of said closure strips;

(c) controlling the flow of said plastic feed materials within said channels by control orifice and adjustable valve control means communicating with each of said first base channel, said first profile channel, said second base channel, and said second profile channel;

(d) passing said plastic feed materials from said second base channel to the die opening for said removable first control bar, and extruding a second base portion therefrom;

(e) passing said plastic feed materials from said first profile channel to the die opening of said removable second control bar, and extruding a first profile portion therefrom;

(f) passing said plastic feed materials from said first base channel to the die opening of said removable third control bar, and extruding a first base portion therefrom; and (g) passing said plastic feed materials from said second profile channel to the die opening of said removable fourth control bar, and extruding a second profile portion therefrom.

31. A method in accordance with claim 30 including joining the extrudates from said first control bar and said fourth control bar before said extrudates exit from the die openings of said first control bar and said fourth control bar.

32. A method in accordance with claim 30 including joining the extrudates from said second control bar and said third control bar before said extrudates exit from the die openings of said second control bar and said third control bar.

33. A method in accordance with claim 30 including joining the extrudates from said first control bar and said fourth control bar before said extrudates exit from the die openings of said first control bar and said fourth control bar, and joining the extrudates from said second control bar and said third control bar before said extrudates exit from the die openings of said second control bar and said third control bar.

34. A method in accordance with claim 30 wherein said plastic feed materials in said second base channel has a composition different from the plastic feed materials of said second profile channel.

35. A method in accordance with claim 30 wherein said plastic feed materials in said second bar channel contain a coloring agent for said second base portion of said closure strips.

* * * * *

UNITED STATES PATENT AND TRADEMARK OFFICE
CERTIFICATE OF CORRECTION

PATENT NO. : 4,540,537
DATED : September 10, 1985
INVENTOR(S) : Ewald A. Kamp

It is certified that error appears in the above-identified patent and that said Letters Patent is hereby corrected as shown below:

Column 6, line 17, for "color" read --coloring--.

Column 6, line 21, for "feel" read --feed--.

Signed and Sealed this

Thirty-first Day of December 1985

[SEAL]

Attest:

DONALD J. QUIGG

Attesting Officer

Commissioner of Patents and Trademarks